(12) United States Patent
Yoon et al.

(10) Patent No.: US 11,862,054 B2
(45) Date of Patent: Jan. 2, 2024

(54) AUGMENTED REALITY OPTICAL DEVICE FOR OUTPUTTING MULTIFOCAL IMAGES

(71) Applicant: Korea Photonics Technology Institute, Gwangju (KR)

(72) Inventors: Seon Kyu Yoon, Gwangju (KR); Ha Mong Shim, Gwangju (KR)

(*) Notice: Subject to any disclaimer, the term of this patent is extended or adjusted under 35 U.S.C. 154(b) by 0 days.

(21) Appl. No.: 17/403,993

(22) Filed: Aug. 17, 2021

(65) Prior Publication Data
US 2022/0208036 A1    Jun. 30, 2022

(30) Foreign Application Priority Data
Dec. 28, 2020  (KR) .......................... 10-2020-0184657

(51) Int. Cl.
| | |
|---|---|
| G09G 3/34 | (2006.01) |
| G02B 27/01 | (2006.01) |
| G09G 3/00 | (2006.01) |
| G09G 3/36 | (2006.01) |
| G02F 1/1362 | (2006.01) |

(Continued)

(52) U.S. Cl.
CPC ......... *G09G 3/001* (2013.01); *G02B 27/0172* (2013.01); *G02F 1/133615* (2013.01); *G02F 1/133616* (2021.01); *G02F 1/136277* (2013.01); *G09G 3/3406* (2013.01); *G09G 3/36* (2013.01); *G09G 2340/0407* (2013.01)

(58) Field of Classification Search
CPC ......... G02F 1/133616; G02F 1/133615; G02F 1/136277; G02B 27/0172; G09G 3/001; G09G 3/3406; G09G 3/36; G09G 2340/0407
See application file for complete search history.

(56) References Cited

U.S. PATENT DOCUMENTS 11,204,587 B2 * 12/2021  Seo ..................... H01S 5/423
2002/0030636 A1 *  3/2002  Richards ............ G02B 27/0172
                                                              362/135
(Continued)

FOREIGN PATENT DOCUMENTS

| KR | 10-1546962 | 8/2015 |
|---|---|---|
| KR | 10-2018-0065714 | 6/2018 |
| KR | 10-2019-0097675 | 8/2019 |

OTHER PUBLICATIONS

English Specification of 10-1546962.
English Specification of 10-2018-0065714.
English Specification of 10-2019-0097675.

*Primary Examiner* — Ricardo Osorio
(74) *Attorney, Agent, or Firm* — ANTONIO HA & U.S. PATENT, LLC

(57) ABSTRACT

According to an embodiment, an augmented reality optical device comprises a light source unit including a plurality of light sources and outputting a plurality of light beams having different light paths, a display element receiving the light beams from the light source unit and reflecting augmented reality images, a reflector reflecting the light beams output from the light source unit and transmitting the augmented reality images reflected by the display element, a beam splitter reflecting the augmented reality images transmitted through the reflector and transmitting real-world light to a user's eye, and a controller controlling the light source unit and the display element.

9 Claims, 9 Drawing Sheets

(51) Int. Cl.
*G02F 1/13357* (2006.01)
*G02F 1/1335* (2006.01)

(56) References Cited

U.S. PATENT DOCUMENTS

| | | | |
|---|---|---|---|
| 2013/0278631 A1* | 10/2013 | Border | G06Q 30/02 345/633 |
| 2017/0299869 A1* | 10/2017 | Urey | G03H 1/2294 |
| 2018/0003962 A1 | 1/2018 | Urey et al. | |
| 2019/0204783 A1* | 7/2019 | Kim | G03H 1/2205 |
| 2019/0293939 A1* | 9/2019 | Sluka | G02B 27/0172 |
| 2020/0285195 A1* | 9/2020 | Shi | G03H 1/0841 |

* cited by examiner

AUGMENTED REALITY OPTICAL DEVICE FOR OUTPUTTING MULTIFOCAL IMAGES

CROSS-REFERENCE TO RELATED APPLICATION(S)

This application is based on and claims priority under 35 U.S.C. 119 to Korean Patent Application No. 10-2020-0184657, filed on Dec. 28, 2020, in the Korean Intellectual Property Office, the disclosure of which is herein incorporated by reference in its entirety.

TECHNICAL FIELD

Embodiments of the disclosure relate to an augmented reality optical device capable of outputting multifocal images.

DESCRIPTION OF RELATED ART

The description of the Discussion of Related Art section merely provides information that may be relevant to embodiments of the disclosure but should not be appreciated as necessarily constituting the prior art.

Augmented reality (AR) may refer to technology of mixing real-world information and virtual images by adding virtual three-dimensional (3D) information images to a real-world environment.

Real-world information may contain information unnecessary for the user or lack information necessary for the user. AR systems mix the real world and a virtual world to thereby provide the user with real-time interaction between the real world and necessary information.

Liquid crystal on silicon (LCoS) displays are a type of conventional augmented reality image output devices. An LCoS display is formed by placing liquid crystals on a silicon wafer and outputs an image while reflecting incident light. FIG. 7 illustrates a conventional LCoS-based augmented reality image output device.

Referring to FIG. 7, a conventional augmented reality image output device 700 includes a light source 710, a display element 720, and a beam splitter 730.

The light source 710 irradiates light to the display element 720. The radiated light may be white light.

The display element 720 reflects the light irradiated from the light source 710 to output an augmented reality image. Although FIG. 7 illustrates that the light emitted from the light source 710 passes through the display element 720 for convenience of description, the display element 720, as an LCoS element, may reflect the light from the light source 710 and outputs an augmented reality image.

The beam splitter 730 reflects the augmented reality image reflected from the display device 720 to a user's eyes.

Thus, the user may view the augmented reality image.

However, the light source 710 in the conventional device 700 is a surface light source that emits surface light and irradiates light to a predetermined area. The user views unifocal augmented reality images that are relatively less realistic.

SUMMARY

An embodiment of the disclosure aims to provide an augmented reality optical device that may output multifocal images which may feel more realistic.

According to an embodiment, an augmented reality optical device comprises a light source unit including a plurality of light sources and outputting a plurality of light beams having different light paths, a display element receiving the light beams from the light source unit and reflecting augmented reality images, a reflector reflecting the light beams output from the light source unit and transmitting the augmented reality images reflected by the display element, a beam splitter reflecting the augmented reality images transmitted through the reflector and transmitting real-world light to a user's eye, and a controller controlling the light source unit and the display element.

The light source unit may include a plurality of point light sources.

The display element may include a liquid crystal on silicon (LCoS) element.

The controller may control the plurality of light sources to sequentially operate to sequentially output the plurality of light beams along the different light paths.

The controller may control the plurality of light sources to sequentially operate and control the display element to output the augmented reality images corresponding to the light paths.

The light source unit may include a lens disposed in front of the light sources in a direction along which the light beams from the light sources travel.

The lens may be disposed a focal length away from each of the light sources.

The lens may convert light beams incident thereon into parallel light beams.

According to an embodiment, an image output device comprises a light source unit including a plurality of light sources and outputting a plurality of light beams having different light paths, a display element receiving the light beams from the light source unit and reflecting augmented reality images, a reflector reflecting the light beams output from the light source unit and transmitting the augmented reality images reflected by the display element, and a controller controlling the light source unit and the display element.

The light source unit may include a lens disposed in front of the light sources in a direction along which the light beams from the light sources travel.

The lens may be disposed a focal length away from each of the light sources.

The lens may convert light beams incident thereon into parallel light beams.

According to the embodiments of the disclosure, it is possible to increase sense of reality by outputting multifocal augmented reality images although an LCoS display is used.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure. Similar reference denotations are used to refer to similar elements throughout the drawings.

The terms "first" and "second" may be used to describe various components, but the components should not be limited by the terms. The terms are used to distinguish one component from another. For example, a first component may be denoted a second component, and vice versa without departing from the scope of the disclosure. The term "and/or" may denote a combination(s) of a plurality of related items as listed or any of the items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

The terms as used herein are provided merely to describe some embodiments thereof, but not to limit the disclosure. As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1A:
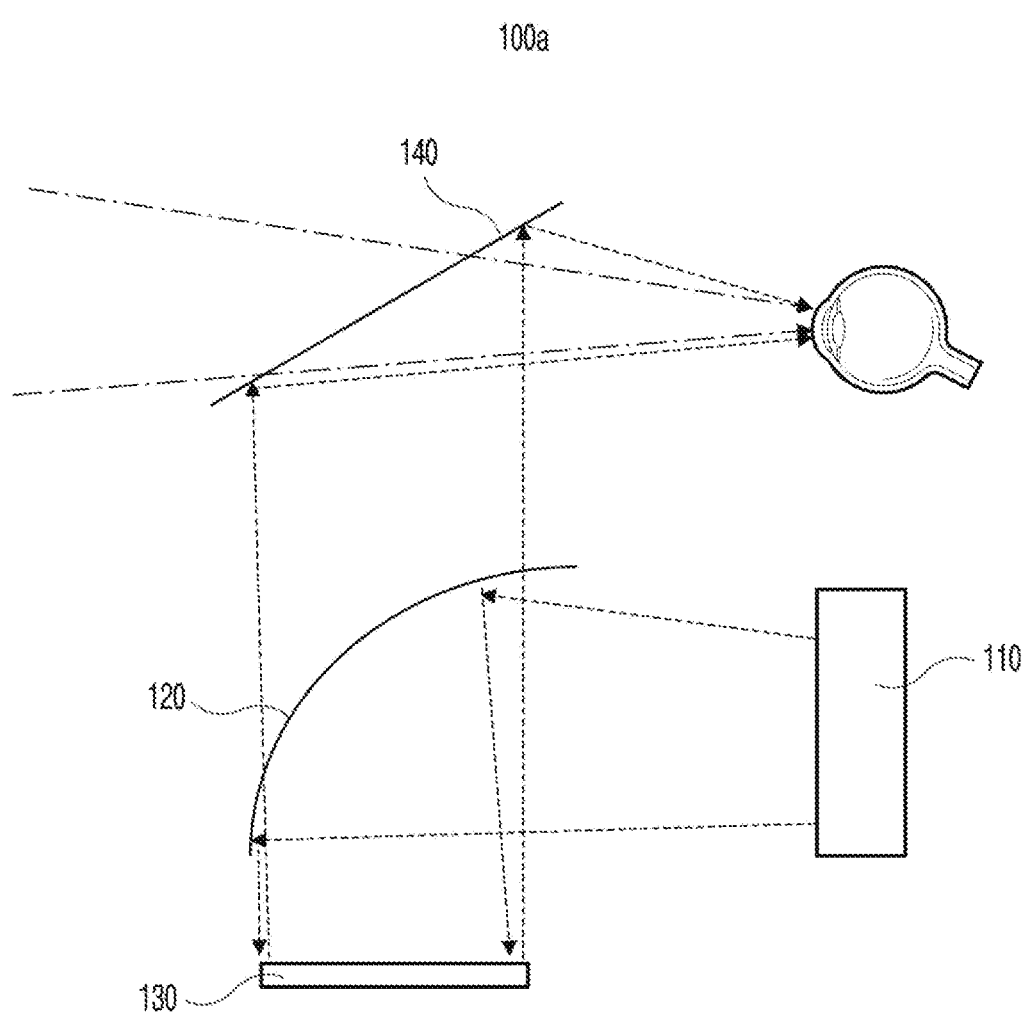
FIG. 1A is a view illustrating a configuration of an augmented reality optical device according to an embodiment.

FIG. 1A is a view illustrating a configuration of an augmented reality optical device according to an embodiment.

Referring to FIG. 1A, according to an embodiment, an augmented reality optical device 100a may include a light source unit 110, a reflector 120, a display element 130, a beam splitter 140, and a controller (not shown).

The light source unit 110 emits light that is to be output as an augmented reality image. The light source unit 110 emits light that is to be reflected from the display device 130 and to be output as an augmented reality image. The light source unit 110 may mainly emit white light but, without limitations thereto, and may emit other wavelength bands of light.

The light source unit 110 outputs a plurality of light beams having different (light) paths. If the light beams enter the user's eye, a difference between the (light) paths may be equal to or less than the width of the pupil of the eye. As the difference between the paths is the width of the pupil or less, all or some of the plurality of light beams may enter the user's eye. Since the light beams are incident on the viewer's eye along different paths, it is possible to implement a multifocal augmented reality image. A detailed structure and operation of the light source unit 110 is described below with reference to FIGS. 2 to 5.

The reflector 120 reflects the light emitted from the light source unit 110 to the display element 130 and transmits the light reflected from the display element 130. However, without limitations thereto, the light irradiated from the light source unit 110 may pass through the reflector 120 and is incident on the display element 130, and the light reflected from the display element 130 may be reflected to the beam splitter 140.

The display element 130 (e.g., a display device) reflects incident light as an augmented reality image. The display element 130 may be implemented as an LCoS element and reflects incident light as an augmented reality image.

The beam splitter 140 reflects the augmented reality image reflected from the display element 130 to the user's eye while transmitting real-world light (e.g., external light) to the user's eye. The beam splitter 140 may be replaced with another optical element, e.g., a half mirror, that performs the same operation as the beam splitter 140.

A controller (not shown) controls the operations of the light source unit 110 and the display element 130.

The controller (not shown) controls the operation of the light source unit 110. As described above, the light source unit 110 outputs a plurality of light beams having different (light) paths. In this case, the controller (not shown) controls the light source unit 110 to simultaneously or sequentially the light beams from light sources arranged at predetermined intervals.

The controller (not shown) controls the operation of the display element 130. The controller (not shown) controls the operation of the light source unit 110 and also controls the operation of the display element 130, corresponding to the operation of the light source unit 110. The augmented reality image corresponding to the output light varies according to the path of the output light. When the light source unit 110 sequentially outputs light beams along specific paths, the controller (not shown) controls the display element 130 to output (or reflect) an augmented reality image corresponding to the light beams of the specific paths.

Accordingly, the user of the augmented reality optical device 100*a* may view the augmented reality image together with the real-world light and, by viewing the multifocal augmented reality image, the user may experience an enhanced sense of reality for the augmented reality image.

When the light source unit 110 simultaneously drives the light sources arranged at regular intervals to output light beams along a specific path, the controller (not synchronized) outputs (or reflects) the augmented reality image corresponding to the light beams to the display element.

Accordingly, the user of the augmented reality optical device 100*a* may view an augmented screen image at a certain distance, together with the real-world light, and may experience the augmented image according to the user's viewing environment.

Therefore, when the light source unit 110 and the display element 130 sequentially interact with each other, each pixel may be reproduced at a different depth depending on the configuration of the image. When the light sources of the light source unit 110, which are arranged at predetermined intervals are simultaneously driven, and the display element 130 interworks with the light sources, all of the pixels of the image are reproduced at the same depth, and the depth of the plane of the image reproduced is determined depending on the interval between the point light sources.

Figure 1B:
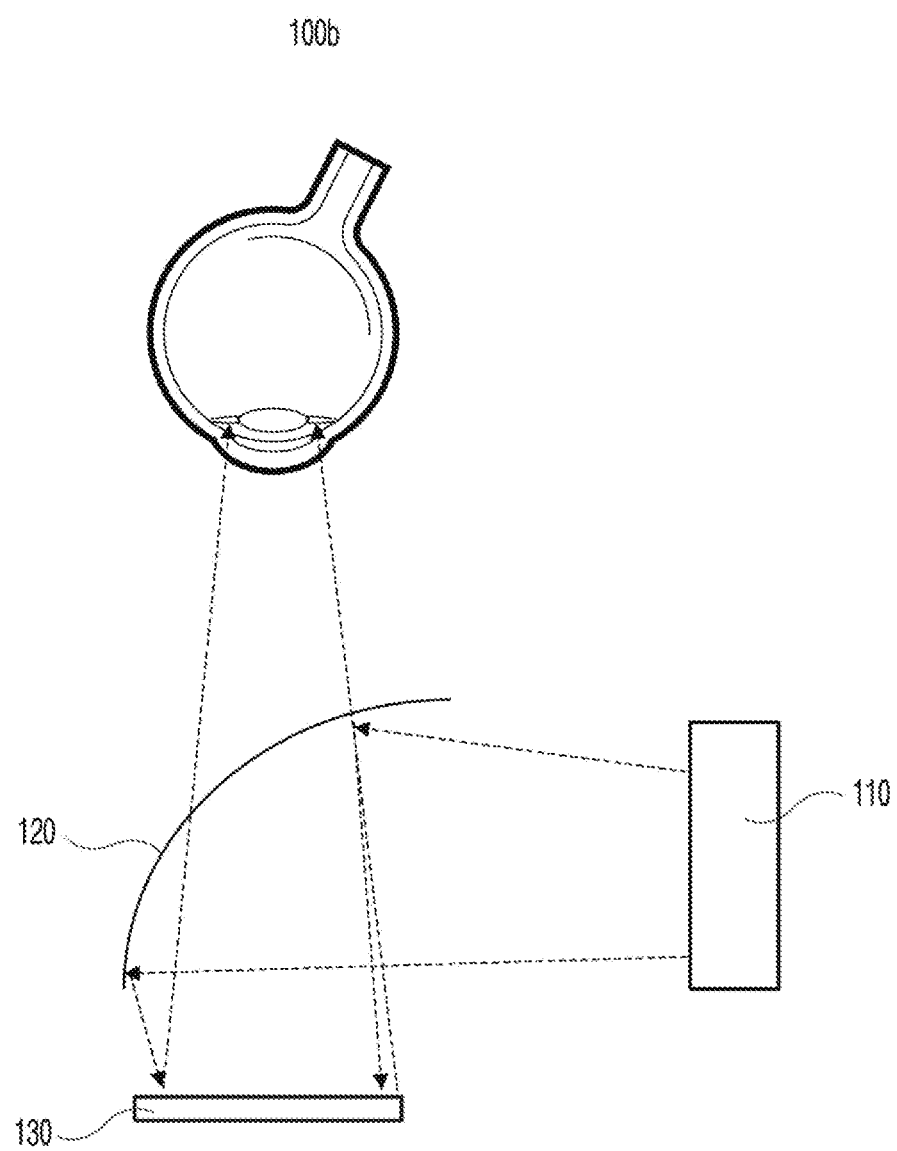
FIG. 1B is a view illustrating a configuration of a virtual reality optical device according to an embodiment.

FIG. 1B is a view illustrating a configuration of a virtual reality optical device according to an embodiment.

Referring to FIG. 1B, a virtual reality optical device 100*b* according to an embodiment may include a light source unit 110, a reflector 120, and a display element 130.

The virtual reality optical device 100*b* may include the remaining components 110 to 130 except for the beam splitter 140 among the components of the augmented reality optical device 100*a*. Each of the components 110 to 130 performs the same operation as that of the augmented reality optical device. However, since the virtual reality optical device 100*b* does not include the beam splitter 140, the virtual reality image reflected from the display element 130 passes through the reflector 120 and is directly incident on the user's eye. If the virtual reality image is output without being directly incident on the viewer's eye, the virtual reality optical device 100*b* may be implemented as a projector.

Figure 2A:
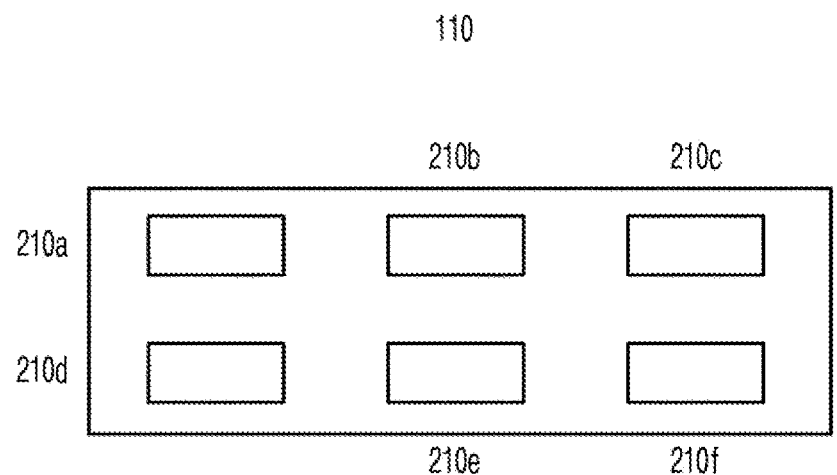
FIG. 2A is a view illustrating a configuration of a light source unit according to a first embodiment.
Figure 3A:
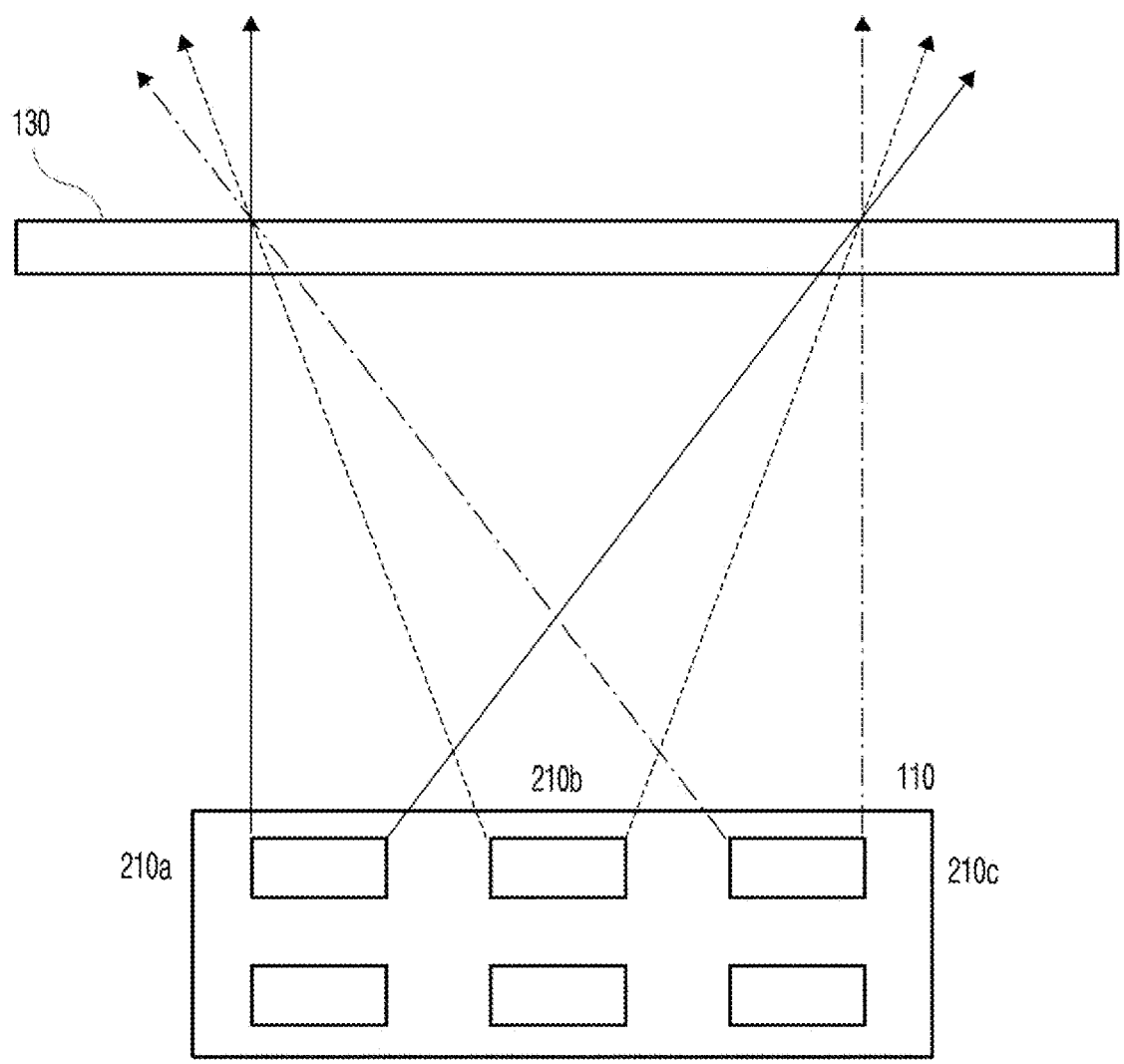
FIG. 3A is a view illustrating an example in which light is output through a light source unit and a display element according to a second embodiment.

FIG. 2A is a view illustrating a configuration of a light source unit according to a first embodiment. FIG. 3A is a view illustrating an example in which light is output through a light source unit and a display element according to the first embodiment. Although the light emitted from the light source unit 110 passes through the reflector 120 and is reflected by the display element 130, FIG. 3 illustrates an example in which the light is transmitted through the display element 130 for convenience of description.

The light source unit 110 includes a plurality of point light sources 210*a* to 210*f* and outputs light beams with different (light) paths, rather than emitting surface light as conventional. The point light sources 210 are arranged apart from each other at predetermined (same or different) intervals and output light beams along different paths. The number of the point light sources included in the light source unit 110 may be varied, but all or some of the point light sources output light beams along different paths.

Each point light source 210*a* to 210*f* outputs a light beam along a different path, and the light emitted from each light source unit is output as an augmented reality image having a different light path while passing through the reflector 120 and the display element 130.

Figure 2B:
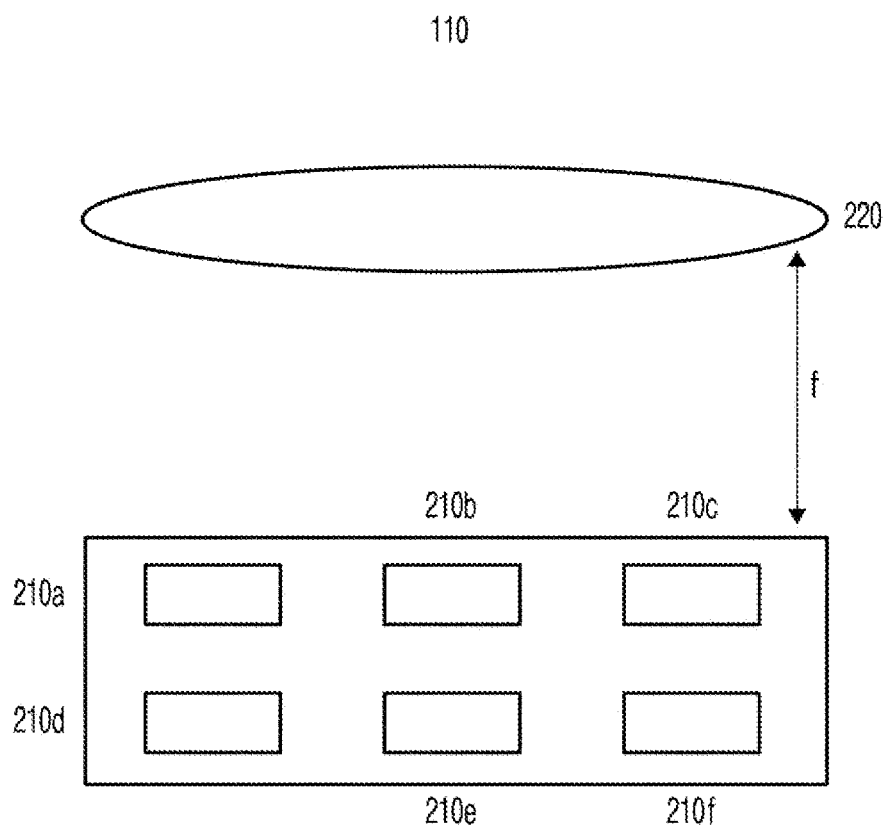
FIG. 2B is a view illustrating a configuration of a light source unit according to the first embodiment.
Figure 3B:
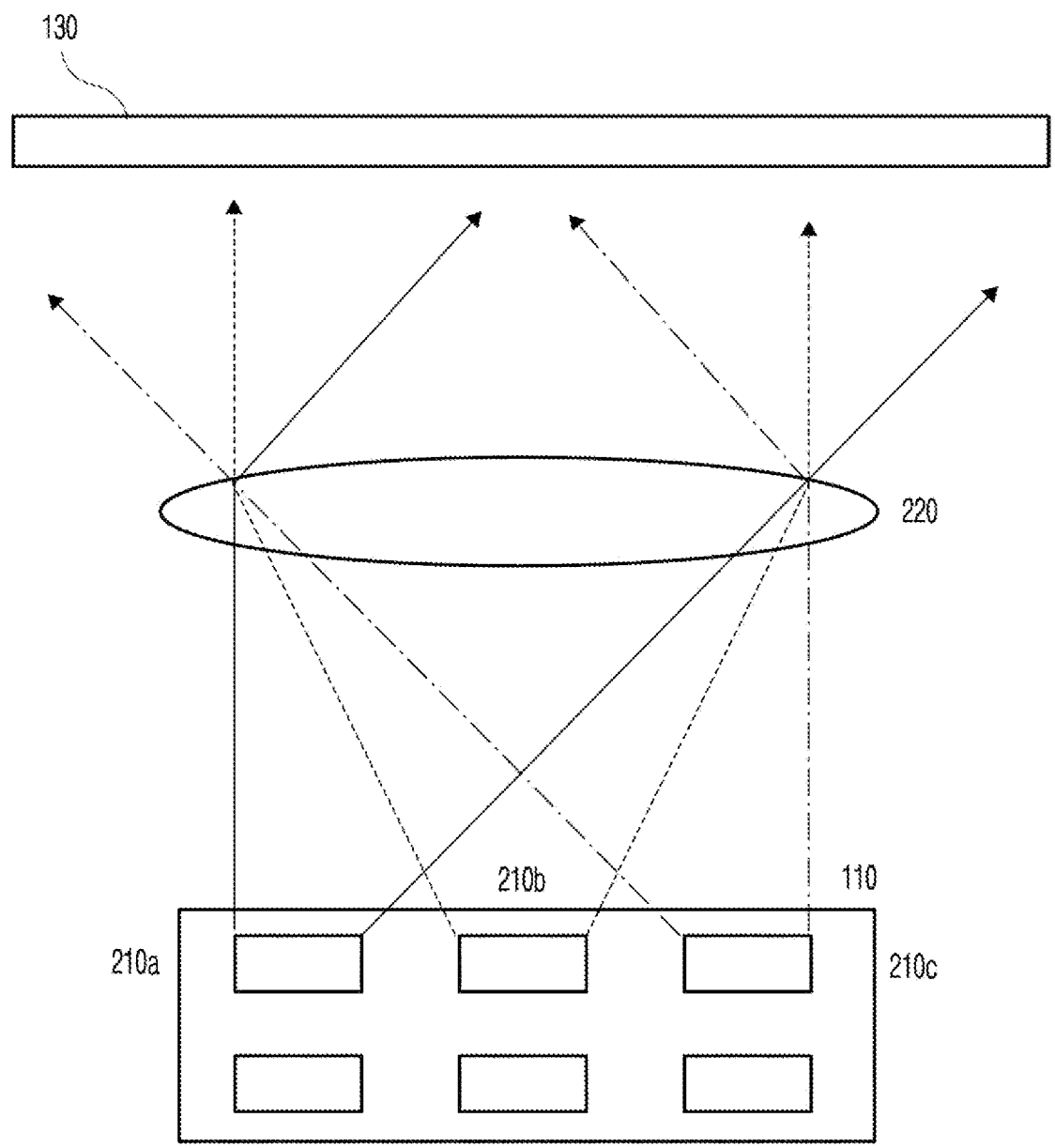
FIG. 3B is a view illustrating an example in which light is output through a light source unit and a display element according to the second embodiment.

FIG. 2B is a view illustrating a configuration of a light source unit according to a second embodiment. FIG. 3B is a view illustrating an example in which light is output through a light source unit and a display element according to the second embodiment.

Referring to FIG. 3B, a light source unit 110 includes a plurality of point light sources 210 and a lens 220. The light source unit 110 may include a plurality of point light sources 210*a* to 210*f*, which are identical to those of the first embodiment, and the lens 220 is positioned the focal length away from the light source unit 110 in the direction along which the light from the light source unit 110 travels.

As in the first embodiment, the point light sources 210 output light beams along different paths, and the output light beams are changed into parallel light beams while passing through the lens 220. Thus, the amount of light of the augmented reality image to be incident on the user's eye may increase.

Figure 4A:
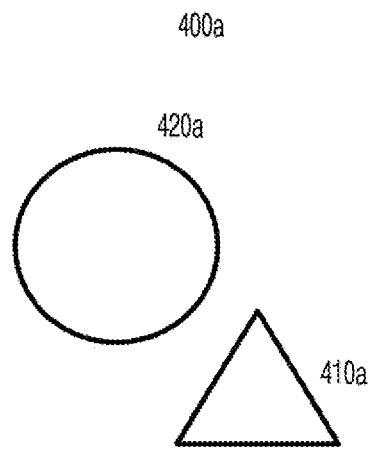
FIGS. 4A, 4B, and 4C are views illustrating an augmented reality image or a virtual reality image output through a light source unit and a display element according to an embodiment.
Figure 4B:
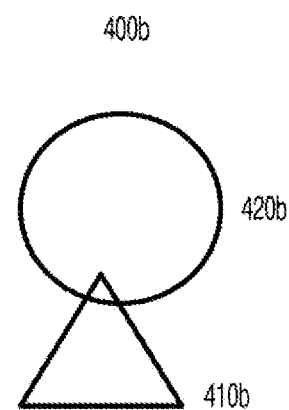
Figure 4C:
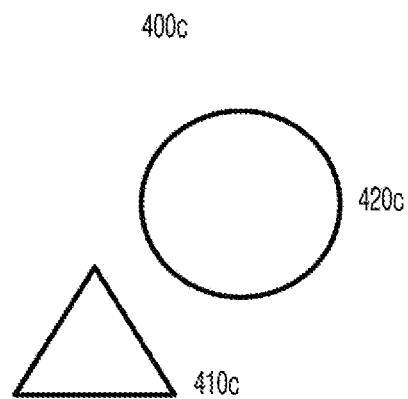

The augmented reality image or virtual reality image output as in the first or second embodiment of the disclosure is illustrated in FIGS. 4A to 4C.

FIGS. 4A, 4B, and 4C are views illustrating an augmented reality image or a virtual reality image output through a light source unit and a display element according to an embodiment.

FIG. 4B illustrates an augmented reality image or virtual reality image 400*b* into which the light emitted from the point light source 210*b* positioned in the center of the light source unit 110 of FIGS. 2A and 2B is converted by the display element 130. Referring to FIG. 4B, in the augmented reality image or virtual reality image 400*b*, a triangle 410*b* and a circle 420*b* overlap each other in a predetermined area.

FIG. 4A illustrates an augmented reality image or virtual reality image 400*a* into which the light emitted from the point light source 210*a* positioned on the left of the light source unit 110 is converted by the display element 130. In the augmented reality image or virtual reality image 400*a*, a circle 420 is output apart, relatively to the left, from a triangle 410*a*, without overlapping the triangle 410*a*.

FIG. 4C illustrates an augmented reality image or virtual reality image 400*c* into which the light emitted from the point light source 210*c* positioned on the right of the light source unit 110 is converted by the display element 130. In the augmented reality image or virtual reality image 400*c*, a circle 420*c* is output apart, relatively to the right, from a triangle 410*c*, without overlapping the triangle 410*c*.

Figure 5:
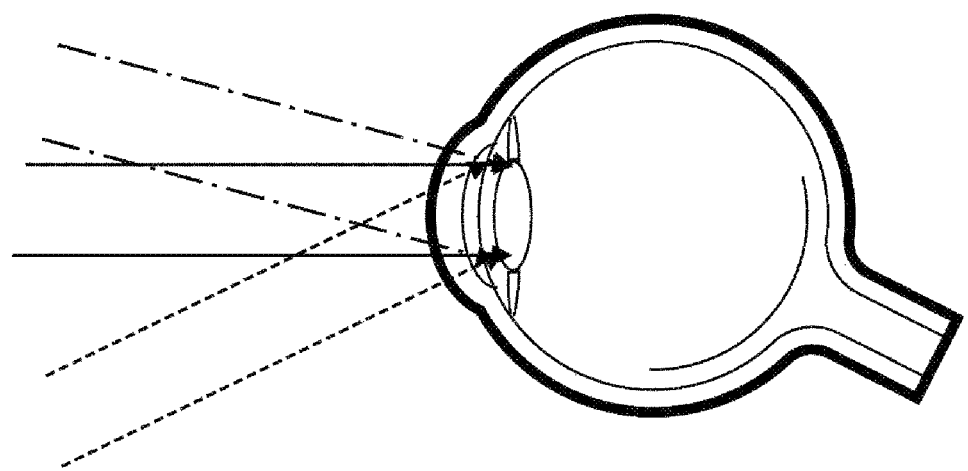
FIG. 5 is a view illustrating a light path along which an image output from an augmented reality optical device is incident on a user's eye according to an embodiment.

The so-output augmented reality or virtual reality images 400*a* to 400*c* are introduced into the user's eye as illustrated in FIGS. 5 and 6.

Figure 6A:
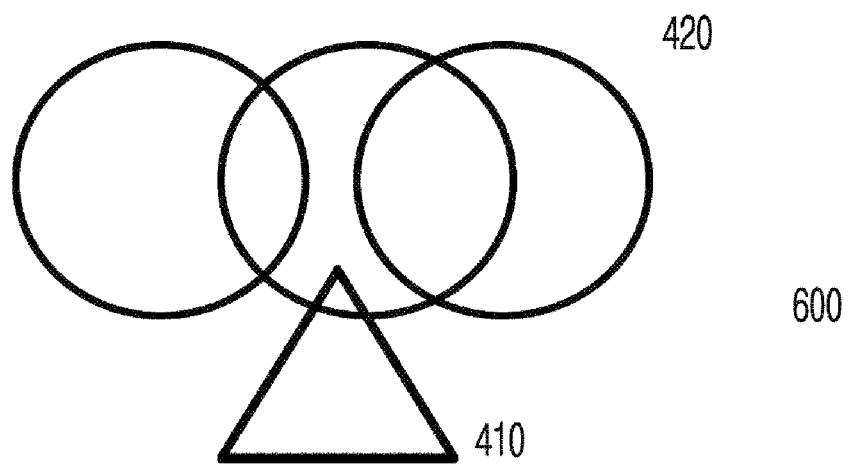
FIGS. 6A and 6B are views illustrating a multifocal augmented reality image output to a user according to an embodiment.
Figure 6B:
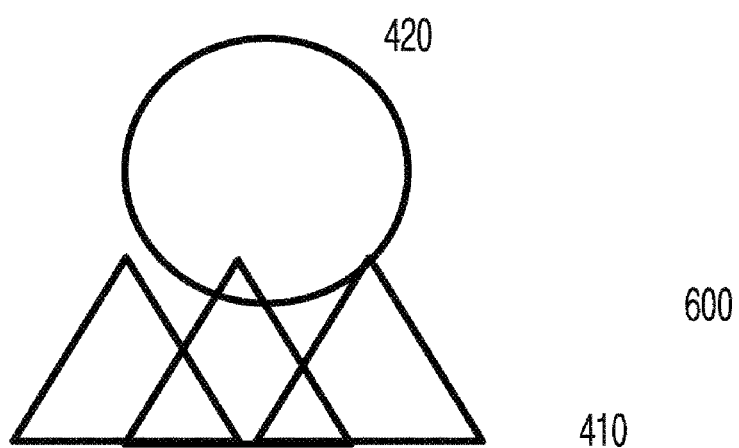
Figure 7:
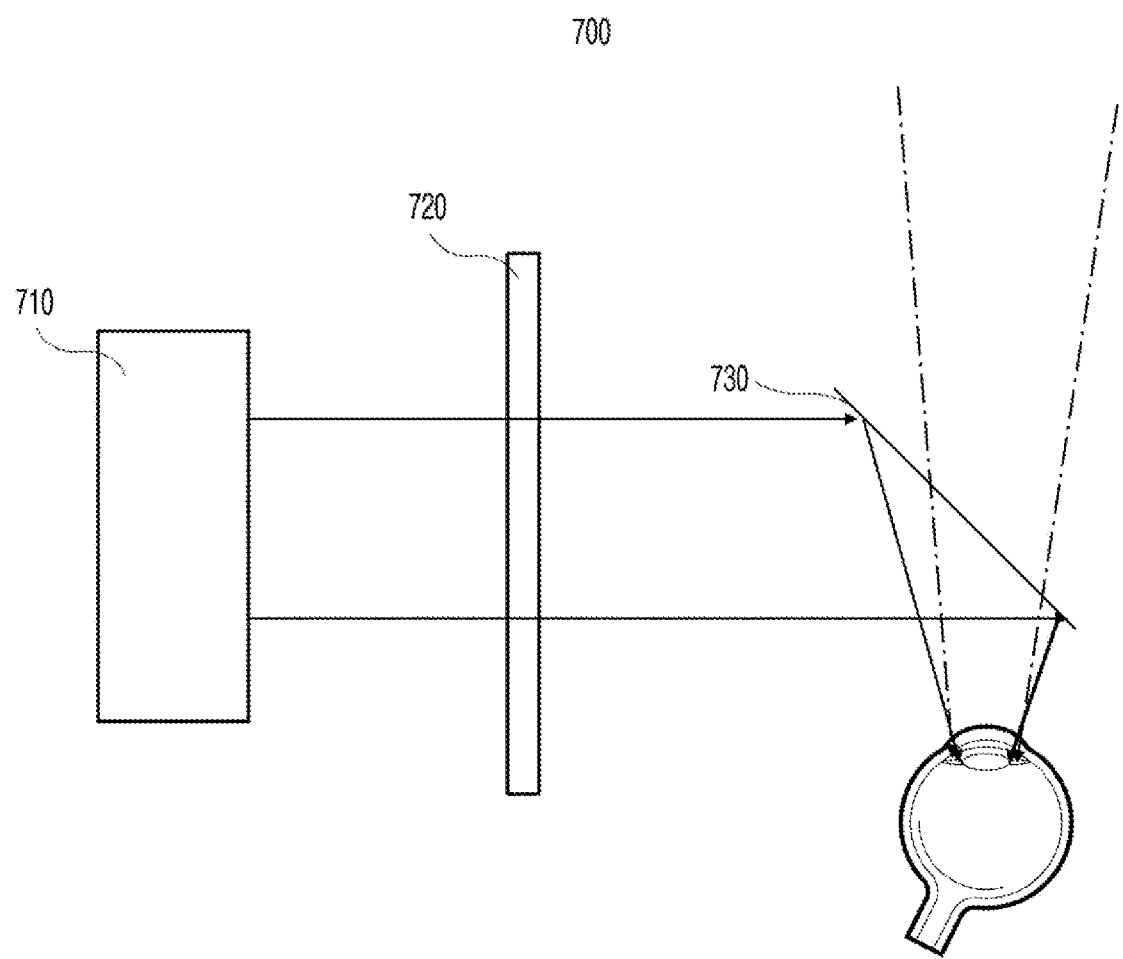
FIG. 7 is a view illustrating an augmented reality image output device according to the prior art.

FIG. 5 is a view illustrating a light path along which an image output from an augmented reality optical device is incident on a user's eye according to an embodiment. FIGS. 6A and 6B are views illustrating a multifocal augmented reality image output to a user according to an embodiment.

Referring to FIG. 5, augmented reality images or virtual reality images having path differences, along with real-world light (not shown), are introduced into the user's eye. Since the path differences between the augmented reality images or virtual reality images obtained by the light output from the point light sources merely amount to the diameter (about 2 to 6 mm) of the user's eye, in particular, the pupil, the augmented reality images or virtual reality images are fully incident on the user's eye. As such, when augmented reality images or virtual reality images having a path difference enter the user's eye, the user sees the image as illustrated in FIG. 6A or 6B.

When the user focuses on the triangle 410, the circle 420 is dispersed in the augmented reality image or virtual reality image 600 as illustrated in FIG. 6A. Accordingly, in the augmented reality image or virtual reality image 600, the triangle 410 looks clear, and the circle 420 looks blurry around the triangle 410. Therefore, when focusing on the triangle 410, the surroundings become blurred, and the user may have a real-world feel.

Conversely, when the user focuses on the circle 420 in the augmented reality image or virtual reality image 600, the circle 420 is clearly viewed to the user, and the triangle 410 is blurred around the circle 420 as illustrated in FIG. 6B.

According to these characteristics, the image may have multiple focuses and provide a more real-world feel to the user.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:

1. An augmented reality optical device, comprising:
   a light source unit including a plurality of point light sources and outputting a plurality of light beams having a difference between the light paths which is equal to or less than the width of the pupil of the user' eye;
   a display element receiving the light beams from the light source unit and reflecting augmented reality images;
   a reflector reflecting the light beams output from the light source unit and transmitting the augmented reality images reflected by the display element;
   a beam splitter reflecting the augmented reality images transmitted through the reflector and transmitting real-world light to a user's eye; and
   a controller controlling the light source unit to sequentially or simultaneously output the light beams and the display element to output the augmented reality images corresponding to the output light paths, wherein the output images have multiple focuses,
   wherein the light beams output from the point light sources pass through the reflector and the display device to be output as the augmented reality images with different light paths, and the augmented reality images corresponding to the output light vary according to the output light paths,
   wherein the depth of the plane of the image reproduced is determined depending on the interval between the point light sources, and
   wherein the path differences between the augmented reality images obtained by the light output from the point light sources amount to about 2 to 6 mm.

2. The augmented reality optical device of claim 1, wherein the display element
   includes a liquid crystal on silicon (LCoS) element.

3. The augmented reality optical device of claim 1, wherein the light source unit includes a lens disposed in front of the light sources in a direction along which the light beams from the light sources travel.

4. The augmented reality optical device of claim 3, wherein the lens
   is disposed a focal length away from each of the light sources.

5. The augmented reality optical device of claim 3, wherein the lens converts light beams incident thereon into parallel light beams.

6. An image output device, comprising:
   a light source unit including a plurality of light sources and outputting a plurality of light beams having a difference between the light paths which is equal to or less than the width of the pupil of the user' eye;
   a display element receiving the light beams from the light source unit and reflecting augmented reality images;
   a reflector reflecting the light beams output from the light source unit and transmitting the augmented reality images reflected by the display element; and
   a controller controlling the light source unit to sequentially or simultaneously output the light beams and the display element to output the augmented reality images corresponding to the output light paths, wherein the output images have multiple focuses, and
   wherein the light beams output from the point light sources pass through the reflector and the display device to be output as the augmented reality images with different light paths, and the augmented reality images corresponding to the output light vary according to the output light paths,
   wherein the depth of the plane of the image reproduced is determined depending on the interval between the point light sources, and
   wherein the path differences between the augmented reality images obtained by the light output from the point light sources amount to about 2 to 6 mm.

7. The image output device of claim 6, wherein the light source unit includes a lens disposed in front of the light sources in a direction along which the light beams from the light sources travel.

8. The image output device of claim 7, wherein the lens is disposed a focal length away from each of the light sources.

9. The image output device of claim 6, wherein the lens converts light beams incident thereon into parallel light beams.

* * * * *